(12) United States Patent
Vedula et al.

(10) Patent No.: US 8,255,189 B2
(45) Date of Patent: Aug. 28, 2012

(54) SYSTEM AND METHOD FOR SOA-BASED WIRE HARNESS DEVELOPMENT

(75) Inventors: Phanindranath Vedula, Macomb, MI (US); Krishna Mohan Rao Nadimetla, Mason, OH (US); Basavaraju Chandra, Batavia, OH (US); Ankush Dharmale, Pune (IN); Gayathri Mariappan, TamilNadu (IN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 414 days.

(21) Appl. No.: 12/567,353

(22) Filed: Sep. 25, 2009

(65) Prior Publication Data
US 2010/0235157 A1     Sep. 16, 2010

Related U.S. Application Data

(60) Provisional application No. 61/159,579, filed on Mar. 12, 2009.

(51) Int. Cl.
*G06F 17/50* (2006.01)
(52) U.S. Cl. ............... 703/1; 703/6; 703/7; 174/72 A
(58) Field of Classification Search ............ 703/1, 6–8; 716/103, 126; 174/72 A
See application file for complete search history.

(56) References Cited

U.S. PATENT DOCUMENTS

| | | | |
|---|---|---|---|
| 4,803,778 A | 2/1989 | Cross | |
| 6,272,387 B1 | 8/2001 | Yoon | |
| 6,954,235 B1 * | 10/2005 | Russell et al. | 349/38 |
| 7,164,957 B2 | 1/2007 | Tsuchiya et al. | |
| 7,725,846 B2 * | 5/2010 | Yvon et al. | 716/103 |
| 7,755,622 B2 * | 7/2010 | Yvon et al. | 345/420 |
| 2004/0172151 A1 | 9/2004 | Sawai et al. | |
| 2004/0230403 A1 | 11/2004 | Tsuchiya et al. | |
| 2005/0183052 A1 | 8/2005 | Ash-Rafzadeh | |
| 2005/0240383 A1 | 10/2005 | Hashima | |
| 2006/0141823 A1 | 6/2006 | Yamane | |
| 2007/0255544 A1 | 11/2007 | Colonnese | |

OTHER PUBLICATIONS

Feldmann et al, Computer-Aided Planning Systems for Integrated Electronic and Mechanical Design, IEEE Transactions on Components, Hybrids, and Manufacturing Technology, vol. 16, No. 4, Jun. 1993, pp. 377-383.*
Cai-Dong et al, SOA Technology and OOHIS System Analysis in College, IEEE, International Conference on Future Information Technology and Management Engineering, 2008, pp. 339-341.*
Smith, Automating Wire Harness Design in Today's Automotive, Aerospace and Marine Industry, Google, Proceedings of the 56th International Wire & Cable Symposium, 2007, pp. 266-273.*
Conru, A.B. A Genetic Approach to the Cable Harness Routing Problem, IEEE World Congress on Computational Intelligence, Proceedings of the First IEEE Conference on Evolutionary Computation, 1994, pp. 200-205.*

(Continued)

*Primary Examiner* — Russell Frejd

(57) ABSTRACT

A method for operating a service oriented architecture (SOA) based wire harness system, a corresponding system, and a machine readable medium. The method includes storing wire harness data in a wire harness data model in a wire harness data processing system, interactively communicating the wire harness data with an electronic computer aided design (ECAD) system and a mechanical computer aided design (MCAD) system through the SOA interface, and storing the wire harness data in the wire harness data model.

21 Claims, 8 Drawing Sheets

OTHER PUBLICATIONS

Mackenzie, et al. Internet Citation—Aug. 2, 2006. retrieved from the internet: URL: www.oasis-open.org/committees/download.php/12601/wd-soa-rm-07.pdf (retrieved on Sep. 21, 2007); Magazine.

Hao He. Sep. 30, 2003. Retrieved from the Internet:URL: http://www.xml.com/lpt/a/ws/2003/09/30/soa.html> (retrieved on Mar. 31, 2006); Others.

* cited by examiner

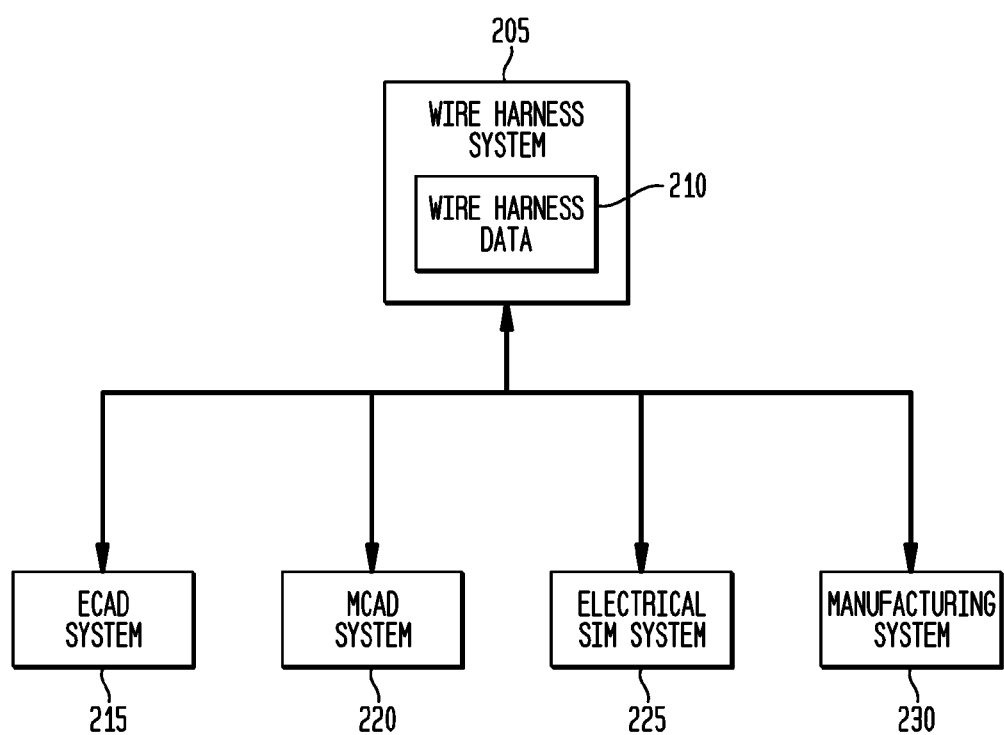

FIG. 4

| BOM Line | Item Type | Connected To | Wire_length | Variant Conditions |
|---|---|---|---|---|
| 000203/A1-Assembly (ElectricalHarness)-Latest Working Date-"Now" | | | | |
| 000203/A1-Assembly (ElectricalHarness) | | | | |
| 000214/A1-ChassisRearLampConnector (view) | HRN_ConHousing | | | |
| 000215/A1-LeftRearLamp (view) | HRN_AssemblyPart | | | |
| 000216/A1-LeftRearLampConnector (view) | HRN_ConHousing | | | |
| 000217/A1-RightRearLampConnector (view) | HRN_ConHousing | | | |
| 000218/A1-RightRearLamp (view) | HRN_AssemblyPart | | | |
| 000219/A1-RightRingTerminal (view) | HRN_AssemblyPart | | | |
| 000220/A1-LeftRingTerminal (view) | HRN_AssemblyPart | | | |
| 000221/A1-ECU_Chassis_Connection | Connection | pN.1,pK.1 | | |
| 000222A,2-LRLC_Chassis_Connection | Connection | pE.1,pL.1 | | |
| 000223/A,2-LRLC_LRT_Connection | Connection | pG.1,pB.1 | | |
| 000224/A,2-LRLC_LRL_Connection | Connection | pA.1,pF.1 | | |
| 000225/A1-ECU (view) | Item | | | |
| 000227/A1-RRLC-Chassis_connection | Connection | pH.1,pM.1 | | |
| 000228/A,2-RRLC-RRL_connection | Connection | pI.1,pB.1 | | |
| 000229/A,2-RRLC-RRT_connection | Connection | pJ.1,pC.1 | | |
| 000214/A1-ChassisRearLampConector (view) | HRN_ConHousing | | | |
| 000215/A1-LeftRearLamp (view) | HRN_AssemblyPart | | | |
| 000216/A1-LeftRearLampConnector (view) | HRN_ConHousing | | | |
| 000217/A1-RightRearLampConnector (view) | HRN_ConHousing | | | |
| 000218/A1-RightRearLamp (view) | HRN_AssemblyPart | | | |
| 000219/A1-RightRingTerminal (view) | HRN_AssemblyPart | | | |
| 000220/A1-LeftRingTerminal (view) | HRN_AssemblyPart | | | |
| 000222A,2-LRLC_Chassis_Connection | Connection | pL.1,pE.1 | | |
| 000223/A,2-LRLC_LRT_Connection | Connection | pG.1,pD.1 | | |
| 000224/A,2-LRLC_LRL_Connection | Connection | pA.1,pF.1 | | |
| 000227/A1-RRLC-Chassis_connection | Connection | pH.1,pM.1 | | |
| 000228/A,2-RRLC-RRL_connection | Connection | pI.1,pB.1 | | |
| 000229/A,2-RRLC-RRT_connection | Connection | pJ.1,pC.1 | | |
| 000230/A1-w1 | HRN_GeneralWire | | | [000203]wheelBase=short wheel base |
| 000231/A1-w2 | HRN_GeneralWire | | | [000203]wheelBase=short wheel base |
| 000232/A1-w3 | HRN_GeneralWire | | | [000203]wheelBase=short wheel base |
| 000233/A1-w4 | HRN_GeneralWire | | | [000203]wheelBase=short wheel base |
| 000234/A1-w5 | HRN_GeneralWire | | | [000203]wheelBase=short wheel base |
| 000235/A1-w6 | HRN_GeneralWire | | | [000203]wheelBase=short wheel base |
| 000236/A1-w7 | HRN_GeneralWire | | | [000203]wheelBase=short wheel base |
| 000237/A1-w8 | HRN_GeneralWire | | | [000203]wheelBase=long wheel base |
| 000238/A1-w9 | HRN_GeneralWire | | | [000203]wheelBase=long wheel base |
| 000239/A1-w10 | HRN_GeneralWire | | | [000203]wheelBase=long wheel base |
| 000240/A1-w11 | HRN_GeneralWire | | | [000203]wheelBase=long wheel base |
| 000241/A1-w12 | HRN_GeneralWire | | | [000203]wheelBase=long wheel base |
| 000242/A1-w13 | HRN_GeneralWire | | | [000203]wheelBase=long wheel base |

FIG. 5

| BOM Line | Item Type | Connected To | Wire_length | Variant Conditions |
|---|---|---|---|---|
| 000203/A1-Assembly (ElectricalHarness)-Latest Working Date-"Now" | | | | |
| 000203/A1-Assembly(ElectricalHarness) | Item | | | |
| 000214/A1-ChassisRearLampConnector(view) | HRN_ConHousing | | | [000203]WheelBase=short wheel base |
| 000215/A1-LeftRearLamp(view) | HRN_AssemblyPart | | | [000203]WheelBase=short wheel base |
| 000216/A1-LeftRearLampConnector(view) | HRN_ConHousing | | | [000203]WheelBase=short wheel base |
| 000217/A1-RightRearLampConnector(view) | HRN_ConHousing | | | [000203]WheelBase=short wheel base |
| 000218/A1-RightRearLamp(view) | HRN_AssemblyPart | | | [000203]WheelBase=short wheel base |
| 000219/A1-RightRingTerminal(view) | HRN_AssemblyPart | | | [000203]WheelBase=short wheel base |
| 000220/A1-LeftRingTerminal(view) | HRN_AssemblyPart | | | [000203]WheelBase=short wheel base |
| 000221/A1-ECU_Chassis_Connection | Connection | pN.1,pK.1 | | |
| 000222/A;2-LRLC_Chassis_Connection | Connection | pE.1,pL.1 | | [000203]WheelBase=short wheel base |
| 000223/A;2-LRLC_LRT_Connection | Connection | pG.1,pD.1 | | [000203]WheelBase=short wheel base |
| 000224/A;2-LRLC_LRL_Connection | Connection | pA.1,pF.1 | | [000203]WheelBase=short wheel base |
| 000225/A1-ECU(view) | Item | | | |
| 000227/A1-RRLC-Chassis_connection | Connection | pH.1,pM.1 | | [000203]WheelBase=short wheel base |
| 000228/A;2-RRLC-RRL_connection | Connection | pI.1,pB.1 | | [000203]WheelBase=short wheel base |
| 000229/A;2-RRLC-RRT_connection | Connection | pJ.1,pC.1 | | [000203]WheelBase=short wheel base |
| 000230/A1-w1 | | | | |
| 000231/A1-w2 | HRN_GeneralWire | | | [000203]WheelBase=short wheel base |
| 000232/A1-w3 | HRN_GeneralWire | | | [000203]WheelBase=short wheel base |
| 000233/A1-w4 | HRN_GeneralWire | | | [000203]WheelBase=short wheel base |
| 000234/A1-w5 | HRN_GeneralWire | | | [000203]WheelBase=short wheel base |
| 000235/A1-w6 | HRN_GeneralWire | | | [000203]WheelBase=short wheel base |
| 000236/A1-w7 | HRN_GeneralWire | | | [000203]WheelBase=short wheel base |

FIG. 6

| BOM Line / Item | Item Type | Connected To | Wire_length | Variant Conditions |
|---|---|---|---|---|
| 000203/A1-Assembly (ElectricalHarness) - Latest Working Date- "Now" | | | | |
| 000203/A1-Assembly(ElectricalHarness) | | | | |
| 000214/A1-ChassisRearLampConnector(view) | HRN_ConHousing | | | [000203]WheelBase=short wheel base |
| 000215/A1-LeftRearLamp(view) | HRN_AssemblyPart | | | [000203]WheelBase=short wheel base |
| 000216/A1-LeftRearLampConnector(view) | HRN_ConHousing | | | [000203]WheelBase=short wheel base |
| 000217/A1-RightRearLampConncter(view) | HRN_AssemblyPart | | | [000203]WheelBase=short wheel base |
| 000218/A1-RightRearLamp(view) | HRN_ConHousing | | | [000203]WheelBase=short wheel base |
| 000219/A1-RightRingTerminal(view) | HRN_AssemblyPart | | | [000203]WheelBase=short wheel base |
| 000220/A1-LeftRingTerminal(view) | HRN_AssemblyPart | | | [000203]WheelBase=short wheel base |
| 000221/A1-ECU_Chassis_Connection | Connection | pN.1,pK.1 | | |
| 000222/A;2-LRLC_Chassis_Connection | Connection | pE.1,pL.1 | | |
| 000223/A;2-LRLC_LRT_Connection | Connection | pG.1,pD.1 | | |
| 000224/A;2-LRLC_LRL_Connection | Connection | pA.1,pF.1 | | |
| 000225/A1-ECU(view) | Item | | | |
| 000227/A1-RRLC-Chassis_connection | Connection | pH.1,pM.1 | | [000203]WheelBase=short wheel base |
| 000228/A;2-RRLC-RRL_connection | Connection | pI.1,pB.1 | | [000203]WheelBase=short wheel base |
| 000229/A;2-RRLC-RRT_connection | Connection | pJ.1,pC.1 | | [000203]WheelBase=short wheel base |
| 000230/A1-w1 | | | | |
| 000231/A1-w2 | HRN_GeneralWire | | 10.0 | [000203]WheelBase=short wheel base |
| 000232/A1-w3 | HRN_GeneralWire | | 11.2 | [000203]WheelBase=short wheel base |
| 000233/A1-w4 | HRN_GeneralWire | | 12.6 | [000203]WheelBase=short wheel base |
| 000234/A1-w5 | HRN_GeneralWire | | 8.9 | [000203]WheelBase=short wheel base |
| 000235/A1-w6 | HRN_GeneralWire | | 56.2 | [000203]WheelBase=short wheel base |
| 000236/A1-w7 | HRN_GeneralWire | | 34.5 | [000203]WheelBase=short wheel base |
| | HRN_GeneralWire | | 100.23 | [000203]WheelBase=short wheel base |

SYSTEM AND METHOD FOR SOA-BASED WIRE HARNESS DEVELOPMENT

CROSS-REFERENCE TO OTHER APPLICATION

This application claims priority from U.S. Provisional Patent Application 61/159,579, filed Mar. 12, 2009, which is hereby incorporated by reference.

TECHNICAL FIELD

The present disclosure is directed, in general, to computer aided design, drafting, manufacturing, and visualization systems (individually and collectively, "CAD systems", and including specialized systems such as ECAD and MCAD systems).

BACKGROUND OF THE DISCLOSURE

The design of complex systems that include mechanical and electrical elements requires wire routing and harness considerations.

SUMMARY OF THE DISCLOSURE

A method for operating a service oriented architecture (SOA) based wire harness system, a corresponding system, and a machine readable medium. The method includes storing wire harness data in a wire harness data model in a wire harness data processing system, the wire harness data including a plurality of variants and options, interactively communicating the wire harness data with an electronic computer aided design (ECAD) system and a mechanical computer aided design (MCAD) system through the SOA interface, and storing the wire harness data in the wire harness data model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2 shows a block diagram of an exemplary system in accordance with disclosed embodiments;

FIG. 4 depicts an exemplary the electrical structure as could be maintained in a disclosed wire harness system;

FIG. 5 depicts an exemplary portion of a configured structure as could be maintained in a disclosed wire harness system;

FIG. 6 depicts an exemplary portion of topology information of the electrical structure as could be maintained in a disclosed wire harness system.

DETAILED DESCRIPTION

Figure 1A:
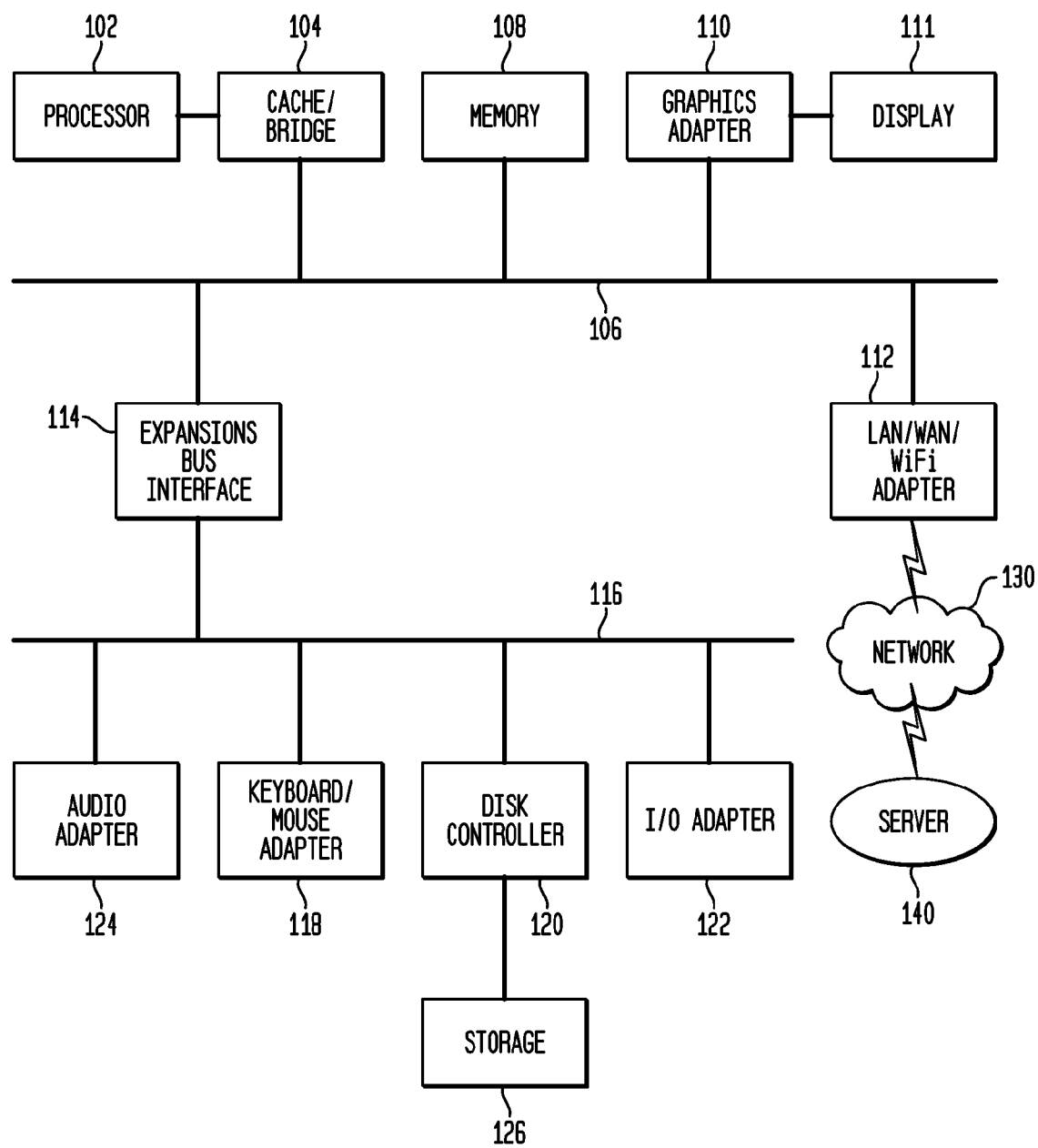
FIG. 1A depicts a block diagram of a data processing system in which an embodiment can be implemented.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Wire harness design, referring herein to the routing, connection, retention, and other management and design of the electrical structure of electromechanical systems, is very complex and spans across multiple engineering applications and processes. Typical harness systems contain hundreds to thousands of connections, miles of wire, and thousands of related parts such as splices, terminals, seals, plugs, tie wraps and shielding devices. Moreover, wire harness structures of larger systems such as an automobile or an aircraft can consist of several variants and build configurations. Therefore, optimal design of wire harness system is one of the major cost drivers to many industries today.

Wire harness design processes involve data transfer among several applications like electronic computer aided design (ECAD), mechanical computer aided design (MCAD), simulation and manufacturing. In other systems, ECAD, MCAD and other applications can directly exchange the harness design without the need of an enterprise infrastructure. However, management and reusability of harness design is very difficult in the latter case.

Traditional harness design in an enterprise environment involves a file-based harness data exchange. In some processes, electrical designers create a two-dimensional (2D) schematic in an ECAD application and the data is passed to an enterprise application in the form of net list (or xml) files along with associated drawing files. Mechanical designers extract the harness information from netlist (or xml) file from the enterprise application, create a corresponding three-dimensional (3D) model and route the wires in an MCAD application. Modified harness data is sent via net list (or xml) and 3d prt files back to the enterprise application. Electrical Designers in turn extract the modified harness from the enterprise application and make necessary modifications to the 2D based on 3D wire harness models with routing data. Design modifications, iterations and harness data exchange using netlist (or xml) files continue between ECAD applications, the enterprise application, and MCAD applications till an optimal wire harness design is achieved. These steps can also be repeated between electrical simulation, manufacturing and enterprise applications before finalizing the wire harness design.

In all these steps, harness design and associated files are managed in an enterprise application. ECAD, MCAD and other external applications provide an interface with the enterprise application in order to vault the design files used in harness exchange. Enterprise applications serve as a central repository of wire harness design and allow better reuse and change management capabilities. In some systems, enterprise-wide server applications and systems serve as a bridge for data exchange.

There are various issues and shortcomings that can effect various wire harness design processes that use a file-based harness data exchange, as described below:

Data redundancy: Wire harness data used in harness exchange is stored in multiple files and applications like ECAD schematics, net list (or xml) files, MCAD prt and drawing files. Many times, ECAD and MCAD applications store/manage harness data in their own proprietary storage apart from the enterprise database. Due to this, severe data loss and errors can occur during harness design exchange.

Computationally expensive data exchange: Data exchange between ECAD applications, enterprise applications, and MCAD applications is semi-automated and labor intensive. Industries spend enormous time during design exchange due to lack of tools for synchronized data transfer between ECAD and MCAD applications.

Variants & options management: A wire harness assembly can consist of several variants and configurations. Exchanging variants & options with netlist (or xml) files is cumbersome since it involves building of several possible harness configurations in real time.

Performance and scalability: Complex harness assemblies involve import/export of large netlist (or xml) files between ECAD applications, enterprise applications, and MCAD applications. Population/Retrieval of harness information from large files often results in many performance and scalability issues.

Even for minor changes, it is typical that ECAD and MCAD application exchange the entire harness data (in the form of xml and netlist files) with the enterprise application. This also leads to severe performance problems during harness data transfer. Hence for real time scenarios, file (netlist or xml) based harness data exchange is not suitable.

Various embodiments include a standard wire harness framework that can be used for harness data exchange without the need of transfer of large files. Some embodiments include a wire harness system with a Service Oriented Architecture (SOA) based interface for wire harness data exchange. Some existing enterprise applications can be modified to perform as described herein, including those that provide an SOA infrastructure that is based on industry standards for web services, primarily adhering to WS-1 and other WS-x standards and best practices. As described herein, some existing enterprise applications can be improved by adding wire harness SOA services, processes, and structures in a wire harness system as described herein. An SOA system for harness data exchange also supports variants and options capabilities. An SOA system can be accessed by external applications in many computer languages.

FIG. 1A depicts a block diagram of a data processing system in which an embodiment can be implemented, for example as an SOA-based wire harness data processing system. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1A may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. In particular, while only one data processing system 100 and a single server system 140 are illustrated here, those of skill in the art will recognize that the embodiments disclosed herein can be implemented in systems with multiple client data processing systems, implemented for example as a data processing system 100, and multiple server systems 140, all connected to communicate with each other over network 130. An enterprise system such as one of the embodiments described herein can be implemented as one or more data processing systems 100 or server systems 140, and can maintain a database of wire harness models and data.

Figure 1B:
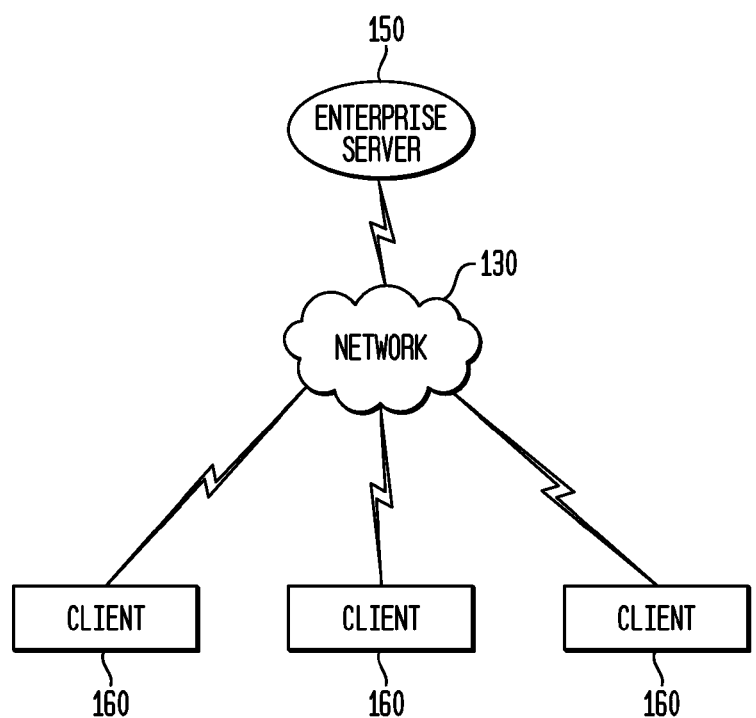
FIG. 1B depicts a block diagram of a data processing system network in which an embodiment can be implemented, for example as an enterprise architecture.

Various embodiments disclosed herein include enterprise-enterprise data exchange, enterprise-client data exchange, and client-client data exchange. In any of these cases, the systems manage the appropriate permissions on a user or client basis to control read, write, and other access to the wire harness data. FIG. 1B depicts a block diagram of a data processing system network in which an embodiment can be implemented, for example as an enterprise, architecture. In this figure, an enterprise server 150, that can be a server system 140, is shown communicating over the network 130. Multiple client systems 160 communicate with enterprise server 150 over network 130, as described herein. Each of the client systems 160 and the enterprise server 150 can be implemented, for example, as a data processing system 100. In this example, each of the client systems 160 can represent a client MCAD system, a client ECAD system, or other client system usable for working with a wire harness data model stored in and mananged by enterprise server 150, as described in more detail herein.

Large, complex wire harness systems are used in many industries. For example, automotive and aircraft manufacturers deal with large wire harness systems. These industries use ECAD and MCAD applications for wire harness design and Enterprise application for vaulting the harness related files. Currently, manufacturers spend enormous amounts of time during harness data exchange (involving large net list or xml files) before finalizing the harness design. The disclosed wire harness integration frameworks, methods, and systems significantly reduce the design exchange time as they eliminate the need of transfer of large files. Further, the disclosed embodiments enable synchronization and management of harness design changes (by ECAD or MCAD) in an enterprise application and data processing system in real time.

In many cases, users of conventional systems create the variants of harness systems in ECAD application and cannot effectively exchange or reuse the data produced. For example, users are not able to use enterprise-based variants capabilities. This can be caused, for example, by difficulty in synchronization of variants of ECAD and Enterprise applications using netlist or xml files. Various wire harness systems and processes described herein support variants and options and thereby enable the seamless transfer of harness data exchange with variants.

Disclosed embodiments utilize a data model that supports a rich set of wire harness features and is based on STEP AP212 and KBL standards, incorporated by reference herein. Using a unified SOA based wire harness system as disclosed herein, external ECAD and/or MCAD applications can create, retrieve, and modify the harness information stored and maintained on a centralized server data processing system.

FIG. 2 shows a block diagram of an exemplary system in accordance with disclosed embodiments. Here, the wire harness system 205 is shown, which manages the wire harness data model (and data) 210 stored in it. Wire harness system 205 can be implemented, for example, as a particularly configured data processing system 100 described above, with an SOA-based interface to external systems, as described herein. Wire harness system 205 communicates with one or more of ECAD system 215, MCAD system 220, electrical simulation system 225, and manufacturing system 230. Each of these client systems can be multiple similar systems, can be combined into common systems, or can represent multiple users and clients, as will be understood by those of skill in the art.

Various embodiments of the disclosed SOA wire harness system provide capabilities as described herein. In some embodiments, the system functions so that external applications can create, modify, and delete harness objects such as harness systems, connections, connectors, devices, pins or terminals, wires, 3D route topology information, cables, shields, wire protections, harness accessories like plugs, etc. In various embodiments, the system functions so that users can add or modify the properties of above objects (like wire length, color etc.). In various embodiments, the system functions so that external applications can create or delete in-structure associations such as connectivity association, pin-to-pin association, device-connector association, connection-wire association, wire protection-route segments association, and wire-route topology association. In various embodiments, the system functions so that external applications can create, retrieve, and delete variants and options on electrical harness structures.

In some embodiments, sample SOA clients in java and c++ can be provided as part of the SOA wire harness system. SOA clients provide examples to exchange the harness data with variants and options. External ECAD and MCAD applications can use the sample clients as a guide for wire harness integration with the wire harness system.

An embodiment of the disclosed SOA wire harness system is described below using the example of a rear lamp lighting system of a vehicle. For simplicity, such a lamp system is considered to have a) short wheel base and b) long wheel base options.

Figure 3:
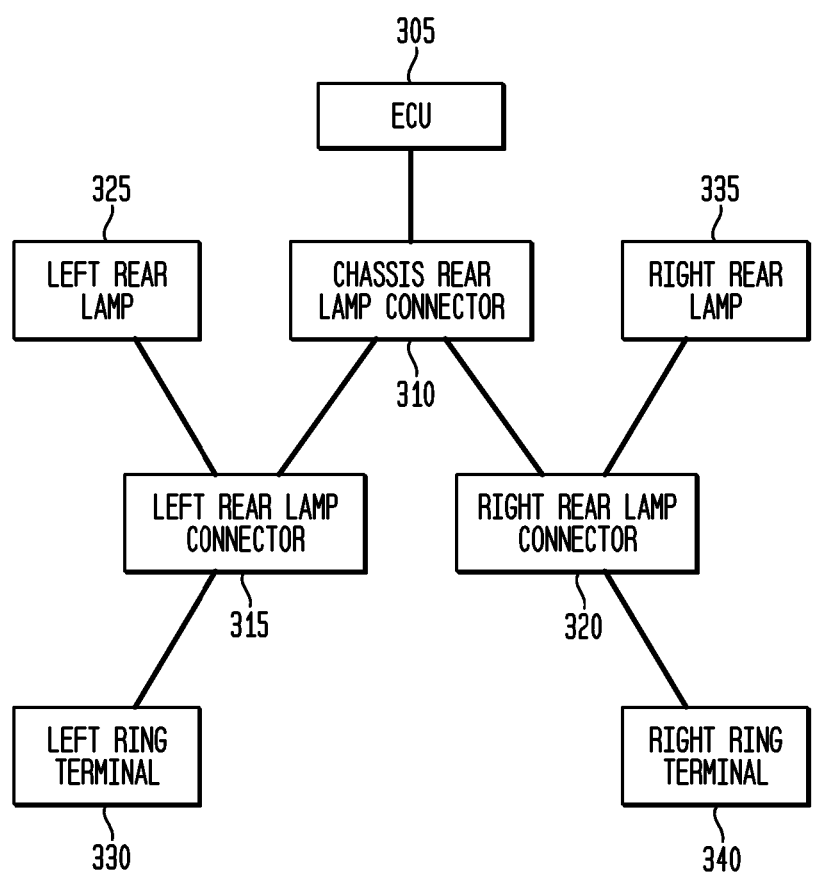
FIG. 3 depicts a block diagram of such an exemplary lighting system as may be managed by the disclosed wire harness system.

FIG. 3 depicts a block diagram of such an exemplary lighting system as may be managed by the disclosed wire harness system. Here, electronic control unit (ECU) 305 is connected to the chassis rear lamp connector 310, which is in turn connected to the left rear lamp connector 315 and the right rear lamp connector 320. The left rear lamp connector 315 is connected to the left rear lamp 325 and the left ring terminal 330. The right rear lamp connector 320 is connected to the right rear lamp 335 and the right ring terminal 340. All these connections are by wires that must be properly routed in the physical environment of the vehicle itself, and so must first be designed and routed using the appropriate CAD systems.

A common scenario of wire harness design involving data exchange between ECAD and MCAD applications and the disclosed wire harness system can consist of the following steps. First, the ECAD application populates the electrical wire harness structures with predefined variants and options in the disclosed wire harness system.

Electrical designers can create a harness system in ECAD and populate the entire harness information with all possible variants and options (this is called as max complexity harness or 150% harness) in the disclosed wire harness system.

External ECAD applications can populate the max complexity harness structure in the disclosed wire harness system as follows, for example.

For population of new large harness structures, a "CreateOrUpdateHarness" SOA interface is provided. This interface can be used to create harness objects such as connectors, devices, shields, cables, wires, terminals and device to connector, connectivity and connection to wire associations.

For creation/update of harness objects under an existing harness structure, the SOA interfaces can include SOA interfaces such as CreateOrUpdateConnections (for creating or updating connections), CreateItemElements (for creation of terminals, pins, etc.), CreateItems (for creating or updating harness objects such as wires, connectors, devices, etc.), AddOrUpdateChildrenToParent (for adding harness objects under any parent in an electrical structure), and CreateInStructureAssociations (for creating device-connector, connection-wire, and other connectivity associations). These granular SOA APIs enable updating of harness design changes in the disclosed wire harness system in real time by external applications.

ECAD applications can create variants and options for max complexity harness structure in the disclosed wire harness system using the SOA APIs such as CreateOrUpdateClassicOptions (for creating or updating option of the max complexity harness structure) and CreateVariantRule (for creating build configurations of the max complexity harness structure).

After the ECAD user or application populates the rear lamp harness structure (max complexity harness) using the disclosed wire harness system, for example, the electrical structure in the disclosed wire harness system could be represented as illustrated in FIG. 4.

An MCAD application retrieves build configurations of electrical harness structures from the disclosed wire harness system. Mechanical designers create corresponding 3D part files in an MCAD application(s). In order to populate the 3D route information for the harness, the MCAD application first retrieves the electrical harness structure configurations from the disclosed wire harness system. The disclosed wire harness system transmits the max complexity wire harness structure, a list of build configurations corresponding to the max complexity wire harness structure, and configured wire harness structure information for any particular build configurations needed.

The corresponding SOA APIs of framework for getting the configured harness structure can include ExpandPSOneLevel and ExapndPSAllLevels (for retrieving the max complexity harness product structure or a configured harness structure) and GetVariantRules (for retrieving the list of build configurations of the max complexity harness structure).

The disclosed wire harness system can then transmit to the MCAD application the list of possible configurations of rear lamp harness, and can further transmit to the MCAD application the configured structure of rear lamp harness for each particular build configuration (e.g., short wheel base and long wheel base configurations).

A portion of the configured structure for short wheel base rear lamp harness could be represented as illustrated in FIG. 5.

The disclosed wire harness system receives modified electrical harness structures that add 3D route topology information for wires from the MCAD application.

SOA interfaces of wire harness integration framework for modification of harness objects with route information can include CreateOrUpdateRouteObjects (for creating or updating 3D wire topology including route nodes, route segments, route curves, and route associations, etc.), and CreateOrUpdateWireData (for creating and updating wire properties including wire color, wire length, etc.).

After MCAD updates the 3D route information and it is received by the disclosed wire harness system, the topology information like wire length can appear as illustrated in FIG. 6.

The disclosed wire harness system, in various embodiments, includes an enterprise application that has an SOA framework for wire harness data transfer. ECAD and MCAD applications can transfer the harness design to by the disclosed wire harness system in the form of netlist (or xml) files. The disclosed wire harness system can communicate with ECAD or MCAD applications to exchange wire harness data with variants and options as disclosed herein.

As discussed above, manufacturers and suppliers spend enormous amounts of time in exchanging harness design data using files. With the disclosed SOA wire harness system, significant performance gains can be achieved compared to file based transfer. Further, harness design changes can be managed in real time using the proposed framework.

Figure 7:
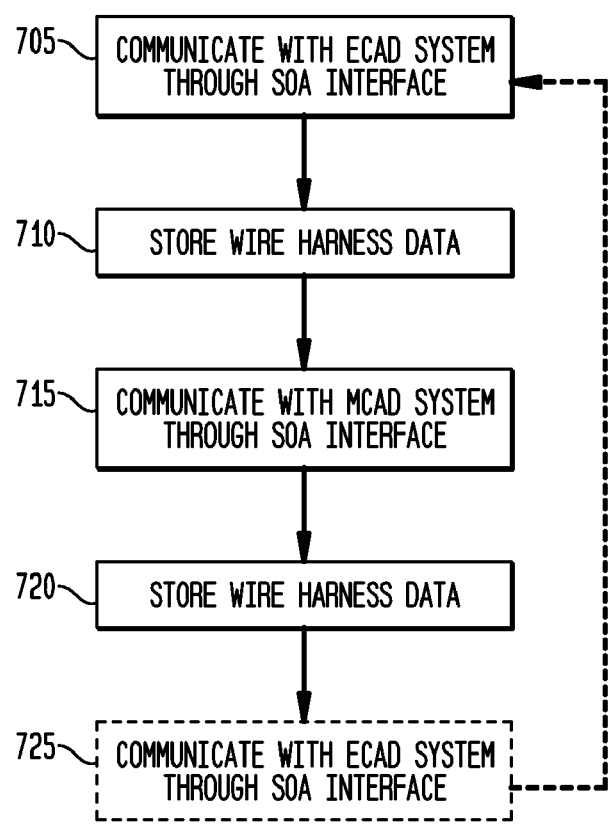
FIG. 7 depicts a flowchart of a process in accordance with a disclosed embodiment.

FIG. 7 depicts a flowchart of a process in accordance with a disclosed embodiment.

A wire harness data processing system stores wire harness data, including a plurality of variants and options associated with the wire harness data. Preferably, this is the max complexity harness with all possible variants and options, but this is not necessarily the case.

The wire harness data processing system interactively communicates ECAD data through an SOA interface and with an ECAD system (step 705), and stores it in a wire harness data model (step 710). This interaction includes transmitting and receiving wire harness data as the ECAD system operates through the SOA interface, and the wire harness data model is updated throughout the interaction. The ECAD data can include a plurality of variants and options for the wire harness data.

The wire harness system interactively communicates MCAD data through the SOA interface and with an MCAD system (step 715), and stores it in the wire harness data model (step 720). This interaction includes transmitting and receiving wire harness data as the MCAD system operates through the SOA interface, and the wire harness data model is updated throughout the interaction. The MCAD data can include a plurality of variants and options for the wire harness data.

The wire harness system optionally interactively communicates with an electrical simulation system and/or a manufacturing system through the SOA interface (step 725). This interaction includes transmitting and receiving wire harness data as the electrical simulation system or manufacturing system operates through the SOA interface, and the wire harness data model is updated throughout the interaction, if necessary.

Steps 705-725 can optionally be repeated, once or multiple times, as the wire harness data is revised and updated by the ECAD system and the MCAD system, and as simulations are run by the electrical simulation system. In various embodiments, each of these interactions thought the SOA interface allows the respective system to access and update only the immediately-needed portions of the data, such as specific items of the wire harness data, without requiring the transfer of large data files in disparate formats.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for operating a service oriented architecture (SOA) based wire harness system, comprising:
    storing wire harness data in a wire harness data model in a wire harness data processing system, the wire harness data including a plurality of variants and options;
    interactively communicating the wire harness data with an electronic computer aided design (ECAD) system, through an SOA interface of the wire harness data processing system, and updating the wire harness data model according to the interactive communication with the EGAD system;
    interactively communicating the wire harness data with a mechanical computer aided design (MCAD) system through the SOA interface, and updating the wire harness data model according to the interactive communication with the MCAD system; and
    storing the updated wire harness data model as an optimal wire harness design.

2. The method of claim 1, further comprising interactively communicating the wire harness data with an electrical simulation system through the SOA interface.

3. The method of claim 1, wherein the interactively communicating and updating steps are repeated.

4. The method of claim 1, wherein the interactively communicating steps include transmitting and receiving portions of the wire harness data as needed by the ECAD system or the MCAD system, including real-time changes to the portions of the wire harness data.

5. The method of claim 1, wherein the updating steps are performed at the same time as the interactively communicating steps.

6. The method of claim 1, wherein the ECAD system, the MCAD system, and the wire harness data processing system are separate data processing systems communicating over a network.

7. The method of claim 1, wherein storing the wire harness data in the wire harness data model comprises storing the entire harness data with all possible variants and options.

8. A service oriented architecture (SOA) based wire harness data processing system comprising a processor and accessible memory, the wire harness data processing system particularly configured to perform the steps of:
    storing wire harness data in a wire harness data model, the wire harness data including a plurality of variants and options;
    interactively communicating the wire harness data with an electronic computer aided design ECAD system through an SOA interface, and updating the wire harness data model according to the interactive communication with the EGAD system;
    interactively communicating the wire harness data with a mechanical computer aided design (MCAD) system through the SOA interface, and updating the wire harness data model according to the interactive communication with the MCAD system; and
    storing the updated wire harness data model as an optimal wire harness design.

9. The SOA based wire harness data processing system of claim 8, further configured to perform the step of interactively communicating the wire harness data with an electrical simulation system through the SOA interface.

10. The SOA based wire harness data processing system of claim 8, wherein the interactively communicating and updating steps are repeated.

11. The SOA based wire harness data processing system of claim 8, wherein the interactively communicating steps include transmitting and receiving portions of the wire harness data as needed by the ECAD system or the MCAD system, including real-time changes to the portions of the wire harness data.

12. The SOA based wire harness data processing system of claim 8, wherein the updating steps are performed at the same time as the interactively communicating steps.

13. The SOA based wire harness data processing system of claim 8, wherein the ECAD system, and the MCAD system, and the wire harness data processing system are separate data processing systems communicating over a network.

14. The SOA based wire harness data processing system of claim 8, wherein storing the wire harness data in the wire harness data model comprises storing the entire harness data with all possible variants and options.

15. A tangible non-transitory machine-readable medium encoded with computer-executable instructions that, when executed, cause a service oriented architecture (SOA) based wire harness data processing system to perform the steps of:
    storing wire harness data in a wire harness data model, the wire harness data including a plurality of variants and options;
    interactively communicating the wire harness data with an electronic computer aided design (ECAD) system, through an SOA interface, and updating the wire harness data model according to the interactive communication with the EGAD system;
    interactively communicating the wire harness data with a mechanical computer aided design (MCAD) system through the SOA interface, and updating the wire harness data model according to the interactive communication with the MCAD system; and storing the updated wire harness data model as an optimal wire harness design.

16. The machine-readable medium of claim 15, further comprising instructions that, when executed, cause the wire harness data processing system to perform the step of interactively communicating the wire harness data with an electrical simulation system through the SOA interface.

17. The machine-readable medium of claim 15, wherein the interactively communicating and updating steps are repeated.

18. The machine-readable medium of claim 15, wherein the interactively communicating steps include transmitting and receiving portions of the wire harness data as needed by the ECAD system or the MCAD system, including real-time changes to the portions of the wire harness data.

19. The machine-readable medium of claim 15, wherein the updating steps are performed at the same time as the interactively communicating steps.

20. The machine-readable medium of claim 15, wherein the ECAD system, the MCAD system, and the wire harness data processing system are separate data processing systems communicating over a network.

21. The machine-readable medium of claim 15, wherein the storing step further includes storing the entire harness data with all possible variants and options.

* * * * *